(12) United States Patent
Mostovych

(10) Patent No.: US 9,323,958 B2
(45) Date of Patent: Apr. 26, 2016

(54) METHOD AND APPARATUS FOR PREVENTION OF TAMPERING AND UNAUTHORIZED USE, AND UNAUTHORIZED EXTRACTION OF INFORMATION FROM SECURED DEVICES

(71) Applicant: Andrew N. Mostovych, Silver Spring, MD (US)

(72) Inventor: Andrew N. Mostovych, Silver Spring, MD (US)

(73) Assignee: Enterprise Sciences, Inc., College Park, MD (US)

( * ) Notice: Subject to any disclaimer, the term of this patent is extended or adjusted under 35 U.S.C. 154(b) by 6 days.

(21) Appl. No.: 14/327,860

(22) Filed: Jul. 10, 2014

(65) Prior Publication Data

US 2015/0026485 A1 Jan. 22, 2015

Related U.S. Application Data

(60) Provisional application No. 61/856,967, filed on Jul. 22, 2013.

(51) Int. Cl.
*G06F 21/60* (2013.01)
*G06F 21/86* (2013.01)

(52) U.S. Cl.
CPC ........ *G06F 21/86* (2013.01); *G06F 2221/2143* (2013.01)

(58) Field of Classification Search
None
See application file for complete search history.

(56) References Cited

U.S. PATENT DOCUMENTS

| | | | | |
|---|---|---|---|---|
| 6,684,335 B1 * | 1/2004 | Epstein, III | ......... | H04L 63/0428 370/256 |
| 7,852,590 B1 * | 12/2010 | Olliges | .......... | H05B 6/80 326/8 |
| 8,458,491 B1 * | 6/2013 | Powell | .......... | G06F 21/60 713/190 |
| 8,458,804 B1 * | 6/2013 | Hyde | .......... | G06F 21/00 726/26 |
| 8,645,716 B1 * | 2/2014 | Dujari | .......... | G06F 12/1433 380/277 |
| 8,812,875 B1 * | 8/2014 | Melvin | .......... | G06F 21/78 380/277 |
| 9,069,933 B1 * | 6/2015 | August | .......... | G06F 21/10 |
| 2004/0134993 A1 * | 7/2004 | Vacherand | .......... | G06K 19/0716 235/492 |
| 2006/0136752 A1 * | 6/2006 | Miller | .......... | G06F 21/60 713/194 |

(Continued)

*Primary Examiner* — Andrew Nalven
*Assistant Examiner* — Christopher Ruprecht
(74) *Attorney, Agent, or Firm* — Miodrag Cekic; Intellectual Property Strategists, LLC

(57) ABSTRACT

The present invention considers an apparatus for prevention of tampering, unauthorized use, and unauthorized extraction of information from at least one secure system including at least one information device arranged to process information, at least one integrated encryption segment arranged to encrypt the information using at least one encryption process enabled by a set of encryption key information incorporated in at least one secure information storage of the at least one information device, at least one destruction driver arranged to initiate and support at least one controllable energy release in a proximity of the at least one secure information storage of the at least one information device incorporating the set of encryption key information, such that at least fraction of the set of encryption key information has been obliterated during the controllable energy discharge.

26 Claims, 11 Drawing Sheets

(56) References Cited

U.S. PATENT DOCUMENTS

| | | | |
|---|---|---|---|
| 2007/0229285 A1* | 10/2007 | Smith | G08B 13/126 340/572.8 |
| 2008/0091605 A1* | 4/2008 | Hughes | G06F 21/31 705/51 |
| 2009/0085602 A1* | 4/2009 | Lazaravich | G06F 21/75 326/8 |
| 2010/0064371 A1* | 3/2010 | Mostovych | G06F 21/554 726/26 |
| 2011/0035813 A1* | 2/2011 | Trantham | G06F 21/78 726/34 |
| 2012/0070002 A1* | 3/2012 | Smith | H04L 9/085 380/277 |
| 2012/0093318 A1* | 4/2012 | Obukhov | G06F 21/6209 380/277 |
| 2012/0151121 A1* | 6/2012 | Braga | G06F 21/79 711/103 |
| 2012/0185636 A1* | 7/2012 | Leon | H01L 23/576 711/102 |
| 2014/0022849 A1* | 1/2014 | Krutzik | G06F 21/80 365/185.33 |
| 2014/0064489 A1* | 3/2014 | Flisnes | G06F 21/79 380/277 |

* cited by examiner

METHOD AND APPARATUS FOR PREVENTION OF TAMPERING AND UNAUTHORIZED USE, AND UNAUTHORIZED EXTRACTION OF INFORMATION FROM SECURED DEVICES

CROSS REFERENCE TO RELATED APPLICATIONS

The current application results from and claims priority benefits of U.S. Provisional Application Ser. No. 61/856,967 filed Jul. 22, 2013. The current application is also related to and claims benefits of U.S. patent application Ser. No. 12/191,725 (resulting in the U.S. Pat. No. 8,332,661, issued Dec. 11, 2012) and coowned U.S. patent application Ser. No. 13/692,545 filed with the U.S. Patent and Trademark Office on Dec. 3, 2012 by the inventor herein. The U.S. patent application Ser. No. 12/191,725 and Ser. No. 13/692,545, and the U.S. Pat. No. 8,332,661 are incorporated herein by reference in its entirety.

FIELD OF THE INVENTION

The invention considers to method and an apparatus for the prevention of tampering, unauthorized use, and unauthorized extraction of information from secured elements of secure information processing system and for the conveyance of the security status of the protected information. The prevention may be based on controlled obliteration of the information by physical destruction of the information containing regions of the secured elements, or by the destruction of information containing regions of the secure processing systems that contain encoding information that may be necessary for the decoding of information stored, processed, or communicated by the not destroyed portions of the secure device or/and (it should be noted that in the framework of the current application, the expression "or/and" is used un emphasize the "inclusive or" logical operator (yielding the "true" results in all cases where either one, some, or all expressions of consideration are "true") plurality of secure devices, or/and by the combination of controlled obliteration of the information by physical destruction of the information containing regions of the secure processing systems and by the destruction of information containing regions of the secured elements that contain encoding information that may be necessary for the decoding of information stored, processed, or/and communicated by the not destroyed portions of the secured elements or/and plurality of secured elements. The secure information processing systems may incorporate elements and information devices including (but are not limited to) mechanical, electric, electromagnetic, electronic, photonic, electro-mechanical, electro-chemical, electro-fluidic, electro-optic, and hybrid devices having macroscopic, microscopic or/and submicroscopic structural or an functional components. The information under protection from unauthorized access may include any or all of: stored data, incompletely erased data, prearranged structures or physical device architectures containing intrinsic information about functions, programs, designs, or fabrication processes of the device under protection. The protected systems and elements may operate as an individual device or/and be assembled as a constituent of more complex systems having a plurality of information devices arranged to perform a plurality of processes or applications.

Another embodiment of the current invention may pertain to the apparatus and methods for conveying the protection status of the information contained in the information containing regions of the secure device. Protection status may be conveyed by the destroyed or non-destroyed status of the information containing region preselected for destruction by at least one of visual inspection, imaging, electronic signaling, optical signaling, mechanical signaling, acoustic signaling, radio signaling, and functional testing of the information containing region of the secure information device.

Other embodiments of the current invention may also relate to apparatus and methods for self-generation of at least one encryption key within the internal operation of the secure system (from thermal random noise for example) such that the user or broader systems using the secure system do not have to know or/and are prevented in principal from knowing the encryption key. Thus, insuring that the destruction of the encryption key stored in the secure device makes substantially all of the secured information at unrecoverable.

It may be noted that at least a portion of information pertaining to the at least one encrypted key may be arranged in, stored on, and/or utilized by the at least one information device. At least for the purposes of the current Application, it should be understood that at least such a portion of information represents the at least one predetermined set of encryption key information. Such a set may, at least partially, include (depending on particular embodiments): different segments of particular realizations or the encryption keys; information on arrangements, assemblies, methods, processes, algorithms, programs, and structures utilized to develop, generate, store, maintain, inspect, test, verify, evolve, change communicate, and apply at least parts of the encryption key; and information regarding security status of the information devices and the secure systems (e.g. data indicating past and current tempering attempts, history of scheduled or responsive changes of security protocols, indications of risk history and projected changes in risk factors and environments etc.); and combinations of the above information and relationships.

BACKGROUND OF THE INVENTION

It may be often necessary to protect large collections of stored data (hard disks, solid state disks, flash memory, etc) from tampering, unauthorized extraction, or/and unauthorized use of pertinent content information. For large information storage volumes, destruction of the full volume may not be practical, economical, or/and reliable. Several embodiments of current time pertain to methods and apparatus for the encryption of the data and storage of the encryption key in a secure device that can be readily destructively obliterated such that it may be substantially impossible to retrieve the encryption key and further extremely improbable to retrieve the encrypted data from the full volume of the system without the destroyed encryption key. It is well known that sufficiently large but manageable encryption key sizes (256 bit today but could easily use 512 or 1024 bit if needed) can be used by relatively modest processors to encrypt and decrypt data at manageable speeds and to make the data substantially unencryptable without the key to the extent that the most powerfully known computers would require many orders of magnitude longer time periods to decrypt the data without the key.

It can be noted that data storage devices prearranged to store sensitive information may need to be decommissioned or/and to be made available for other uses. Complete erasure of data from many storage systems may be substantially unachievable because of remainance issues in storage media (e.g. common hard disks and solid state memories). Under certain circumstances, an excessive number of read-write cycles may be required on each data storage location to safely sanitize a data storage system for an acceptable level of protection. This can be very costly and subject to possible errors and risks that all or at least an effective portion sensitive data may not be removed or/and obliterated from the systems. Various embodiments of the present invention may provide relatively secure single point solution that substantially instantly removes all (rewritable, contextual, and structural) data from a storage volume. In particular, substantially all of the data on the storage volume may be encrypted with at least one key that may be stored (integrally or/and on segment bay segment basis) on at least constituent or/and associated information devices of the secure system. The physical destruction and obliteration of the information regions where the at least one key may be stored may, substantially in real time, make the protected data on the storage volume irretrievable or/and unusable.

Often, encryption systems management and securing or the encryption may represent a sensitive link in the security of the system. Users may store copies of passwords from which keys are generated in inappropriate or/and insecure locations, the key may be intercepted in system transmission, or an individual under duress may be forced to reveal the key (password) against their wishes. Different embodiments of the present invention may contribute to alleviation of such problems by offering a mode of operation where the key may be randomly self-generated inside the secure system and only stored within the volume of a self-destructible encryption key container. Substantially all encryption and decryption of data to and from the secure system may be conducted with the internal key. If the system is tampered with or/and if the user feels that the data may be immanently compromised the secure system or/and the secure system user can initiate destruction of the key container such that the effective portion of stored information becomes permanently obliterated. No amount of coercion of the user may retrieve the secured information. Thus, an effective protection for loss in the field of sensitive systems such as intelligence operative equipment, surveillance aircraft, etc. may be effectuated.

One common problem with secure systems may pertain to desirability to directly and unambiguously know the state of the system's security: Has the system been tampered with? Has all sensitive information been erased? Has the user's command to destroy the stored information been successful? etc. Some embodiments of the current invention pertain to such problems by providing a direct method for conveying information about the state of the system security. By obliterating a small information containing region of a secure device and making that destruction directly observable or/and plainly visible to visual inspection, for example via a observation window to the information containing region it may be possible for practitioners to unambiguously discern that the information containing region have been destroyed along with the key that was stored in it as well as the information that may be encrypted with it. The observer can instantly know that substantially all of the many hundreds of gigabytes of data have been destroyed—all instantly, without the need of any additional hardware, software, or/and analysis. Furthermore, this can be surmised by non-specialist personnel that are not trained in the particulars of data security. In addition, different embodiments of the current invention may also provide for further methods that may support, supplement or substitute for visual inspection providing an effective and direct conveyance of the status of the date security in terms of the destruction of the information containing region.

SUMMARY OF THE INVENTION

The present invention considers a method and an apparatus for prevention of tampering, unauthorized use, and unauthorized extraction of information from at least one secure system including at least one information device arranged to communicate, assemble, control, process, or/and store information; at least one integrated encryption segment associated with the at least one information device and arranged to encrypt the information using at least one encryption process enabled by at least one predetermined set of encryption key information incorporated in at least one secure information storage of the at least one information device; and at least one destruction driver arranged to initiate, and support at least one controllable energy release in a proximity of the at least one secure information storage of the at least one information device incorporating the at least one predetermined set of encryption key information, such that at least a fraction of the at least one predetermined set of encryption key information has been obliterated during the controllable energy discharge.

The obliterated fraction of the predetermined set of encryption key information has been preselected to include a functional segment of encrypting key information necessary for decoding of the at least one information device communicated, assembled, controlled, processed, or/and stored information.

BRIEF DESCRIPTION OF THE DRAWINGS

The above and other embodiments, features, and aspects of the present invention are considered in more detail in relation to the following description of embodiments shown in the accompanying drawings, in which.

DETAILED DESCRIPTION OF THE INVENTION

Figure 1:
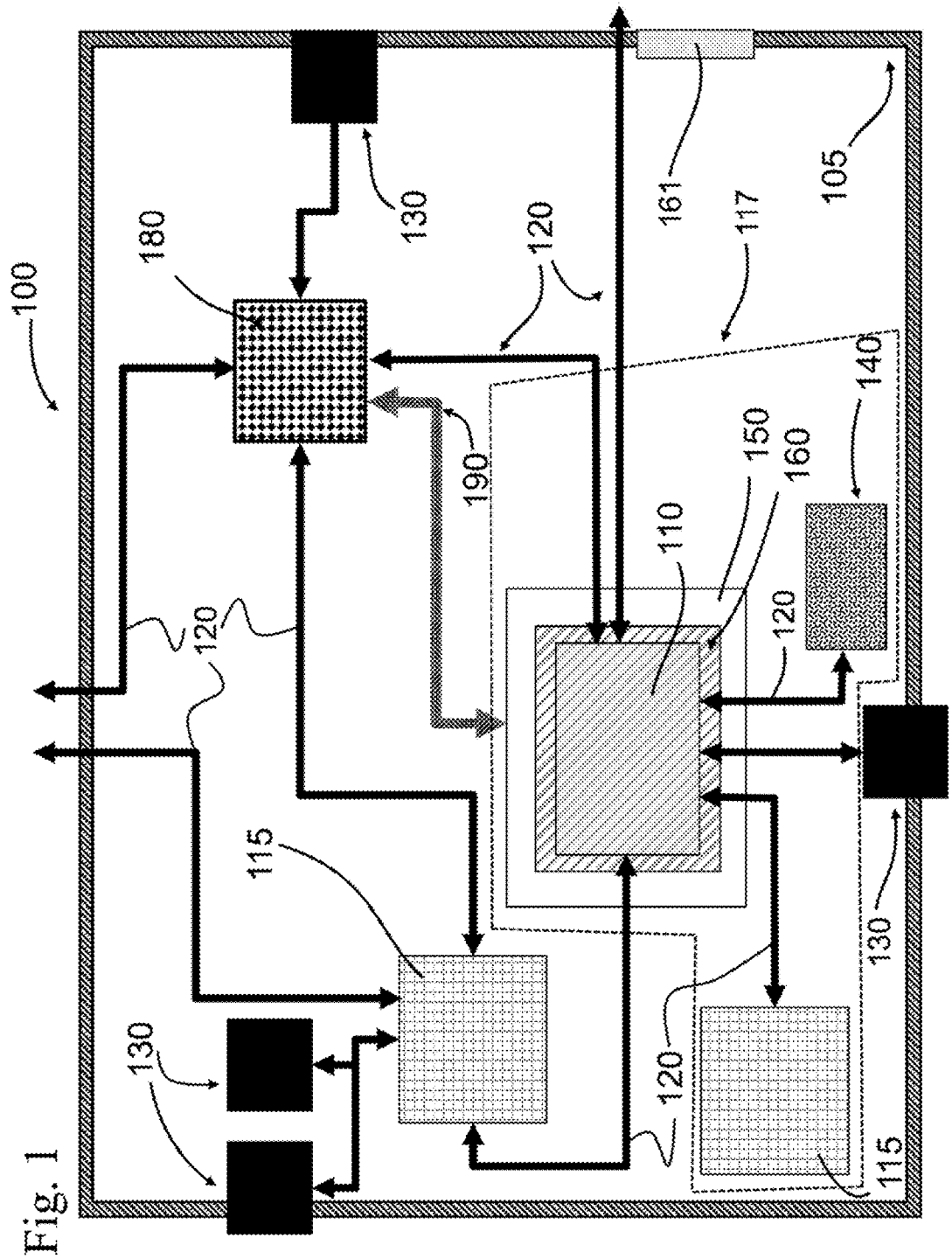
FIG. 1 is a schematic view of an embodiment of a device in accordance with the present invention.

FIG. 1 represents a schematic for an embodiment of the current invention for a secure system 100 (bounded by a system enclosure 105 in the FIG. 1 illustrated embodiment) that securely processes, stores, and communicates information. The secure system of current invention embodies at least one integrated encryption device 110 that is a specialized embodiment of an information device 115. The at least one integrated encryption device 110 of some embodiments may be arranged to operate as a separate unit or/and be associated with additional elements (including, for example, information pathways 120 and other information devices 115) in at least one integrated encryption segment 117.

The information device 115 of the present invention represents a device that may perform at least one of the following: manipulate information; perform logical and numerical operations with information; transform information; create information; destroy information; send information to other information devices 115; receive information from other information devices 115; receive information that is made available to it on its connection to at least one information pathway 120; send information out on its connection to at least one information pathway 120; store information; control other information devices 115; be controlled by other information devices 115; control functional devices 130; be controlled by functional devices 130; send information to functional devices 130; and receive information from functional devices 130.

Functional devices 130, as defined in the context of the present a application and utilized to recite features of the presented embodiments of the current invention, represent devices (and combinations of devices) that produce at least one of the following actions and its combinations: transforming energy on the basis of information that is made available to them; producing information on the basis of energy transformations that are made available to them; transforming energy on the basis of information that is made available to them, and producing information on the basis of energy transformations that are made available to them. Thus, the functional device 130 may transform energy or be transformed energy in various forms, including but not limited to: magnetic, electric, magnetic, electromagnetic, nuclear, mechanical, fluidic, gravitational, chemical, thermal, pressure, and biological. A set of exemplary functional devices 130 may include (but is not limited to) keyboards, keypads, switches, sensors, thermal sensors, pressure sensors, optical detectors, image detectors, radio receivers, encoders, rf (radio frequency) transmitters, servo motors, electromechanical actuators, transducers, plasma generators, lasers, video displays, LED displays, LCD displays, indicator light devices, and combinations of the above.

As defined above, the integrated encryption device 110 represents a specialized information device 115 that may conduct processes to encrypt information with encryption algorithms that use encryption key information from at least one of the following encryption key storage locations: encryption key information stored in information containing regions of the integrated encryption device 110; encryption key information stored in information containing regions within other information devices 115. For example, in different embodiments encryption algorithms may be she available to the integrated encryption device 110 by any combination of the following: algorithms may be prearranged within the encryption device; algorithms may be transferred to the integrated encryption device 110 from other information devices 115; algorithms may be transferred to the integrated encrypted device 110 from functional devices 130; algorithms may be transferred to the encryption device from the information pathway 120.

The encryption key information that may be used by the integrated encryption devices 110 of different exemplary embodiments may be generated using, but not limited to, any or any combination of the following actions: The encryption key information may be prearranged in at least one of the encryption key storage locations; the encryption key information may be communicated form external environment via at least one information path 120; the encryption key information may be transferred form a functional device 130 and stored in at least one of the encryption key information storage locations; the encryption key information may be generated by algorithms executed by an information device 115 and stored in at least one of the encryption key information storage locations; the encryption key information may be generated by at least one physical key generator 140 and stored in at least one of the encryption key information storage locations.

The physical key generators 140 of different embodiments may use inherently random or/and semi-random physical processes to generate at least one variable portion of at least one encryption key information included in at least one encryption key. These physical processes may include but are not limited to: thermal noise, flicker noise, semiconductor junction noise, quantum mechanical noise, radioactive decay, cosmic ray induced noise, system fabrication imperfections, system attributes, acoustic noise, chaos generators, photon noise, and appropriate combinations of the above processes.

Using at least one integrated encryption device 110, the secure systems 100 of various embodiments may encrypt information from any or/and any combination of the following information sources: information external to the secure system that comes to the system through at least one of the information pathways 120; information generated as a result of processing by at least one information device 115 of the secure system 100; information self-generated by at least one information device 115 of the secure system 100; from at least one functional device 130 of the secure system 100; information stored anywhere within the secured system 100. Information encrypted by the secure system 100 may be further acted upon by the secured system 100 by at least one (or any combination) of the following: processed by at least one information device 115 of the secure system 100; stored in at least one information device 115 of the secure system 100; transferred for external use outside of the secure system 100 by at least one information pathway 120; sent to a functional device 130; at least partially destroyed.

In the secure system 100 of this embodiment at least some of the information containing regions, including regions that store at least part of the stored encryption key within the integrated encryption device 110 may be prearranged to be located in the vicinity of at least one destruction device 150 such that when at least one destruction driver 180 may be commanded to destroy the information in an information containing regions the destruction driver 180 delivers sufficient energy or/and information to at least one destruction device 150 through at least one destruction conduit 190 to empower the destruction device 150 to produce destruction (obliteration) of information in the information containing regions. The destruction of the information makes the information unrecoverable and when the destroyed information contained at least part of the stored encryption key the destruction of the said information makes all other information that was encrypted with the encryption key unrecoverable.

In such embodiments, destruction of information may be achieved with a destruction device 150 that may be prearranged to produce physical destruction of the information containing regions with destructive processes that may include but are not limited to: embedded loads, high voltage discharges, embedded loads with energetic material, energetic material energy releases, mechanical destruction, electro-mechanical destruction, localized heating, laser ablation, chemical reactions, acoustic driven shattering, and appropriate combinations of processes. Some examples of such destructive procedures have been disclosed in above application Ser. Nos. 12/191,725 and 13/692,545, and incorporated above and herein by reference.

The destruction driver may be prearranged to initiate destruction by the destruction device 150 when commanded by at least one of the following information inputs: (a) information from functional devices 130 that may include but is not limited to include information from: push-button positive electrical contact switches, multiple press push-button trigger sequence generators, keypad trigger generators, physical, key switches, rotational encoder switch, touch pad switches, capacitive switches, fingerprint readers, palm readers, retinal readers, tamper sensors, pressure sensors, radiation sensors, thermal sensors, electromagnetic radiation sensors, acoustic sensors, vibration sensors, etc.; (b) external information coming into the secure system through at least one of the information pathways 120; (c) internal self generated information coming from at least one for device 115 of the secure system 100.

In one class of embodiments, the secure system 100 may be prearranged to have the information containing regions of the integrated encryption device 110 preselected for destruction to be observable (including but not limited to viewing by observers eye, imagining by a camera end/or a scanner, using a spectrally resolved radiation in a spectral instrument, detection of reflected or/and scattered radiation, colorimetric measurements, polarization measurements, temperature measurements or/and combinations) through a viewing window 160 arranged on the integrated encryption device 110. In particular embodiments at least one additional viewing window 161 may be arranged on the secure system enclosure 105 such that the status of the at least one information containing regions of the integrated encryption device 110 preselected for destruction may be observable by observers (or/and measurement devices) arranged outside of the secure system enclosure 105 of the secure system 100. By direct visual inspection of the integrated encryption device 110 information regions through the viewing window 160, any ordinary practitioner may determine if the information regions has been destroyed or not destroyed, and thereby directly determine if the encryption key at least partially stored in the information region has been destroyed or not destroyed. Furthermore, any ordinary practitioner may directly determine if the encrypted information stored in the secure system 100 has been made inaccessible or not inaccessible.

Also, in different embodiments of the secure system 100, several components comprising the secure system 100 schematically illustrated in FIG. 1 as separate entities for the purpose of clarity, may be rearranged at least as one of the following: the entities of secure system 100 may be separate physical devices; the entities of the secure system 100 may be collections of multiple physical devices prearranged to provide the function of any one entity; the entities of secure system 100 or be distinct physical regions of an integrated single device; the entities of secure system 100 may be collections of multiple distinct physical regions of an integrated single device prearranged to provide the function of any on entity; the entities of secure system 100 may be the arrangements of a reconfigurable device that may be configured to provide the functions of the secure system 100 entity functions. In addition, a plurality of combination arrangements may be included in particular embodiments.

Figure 2:
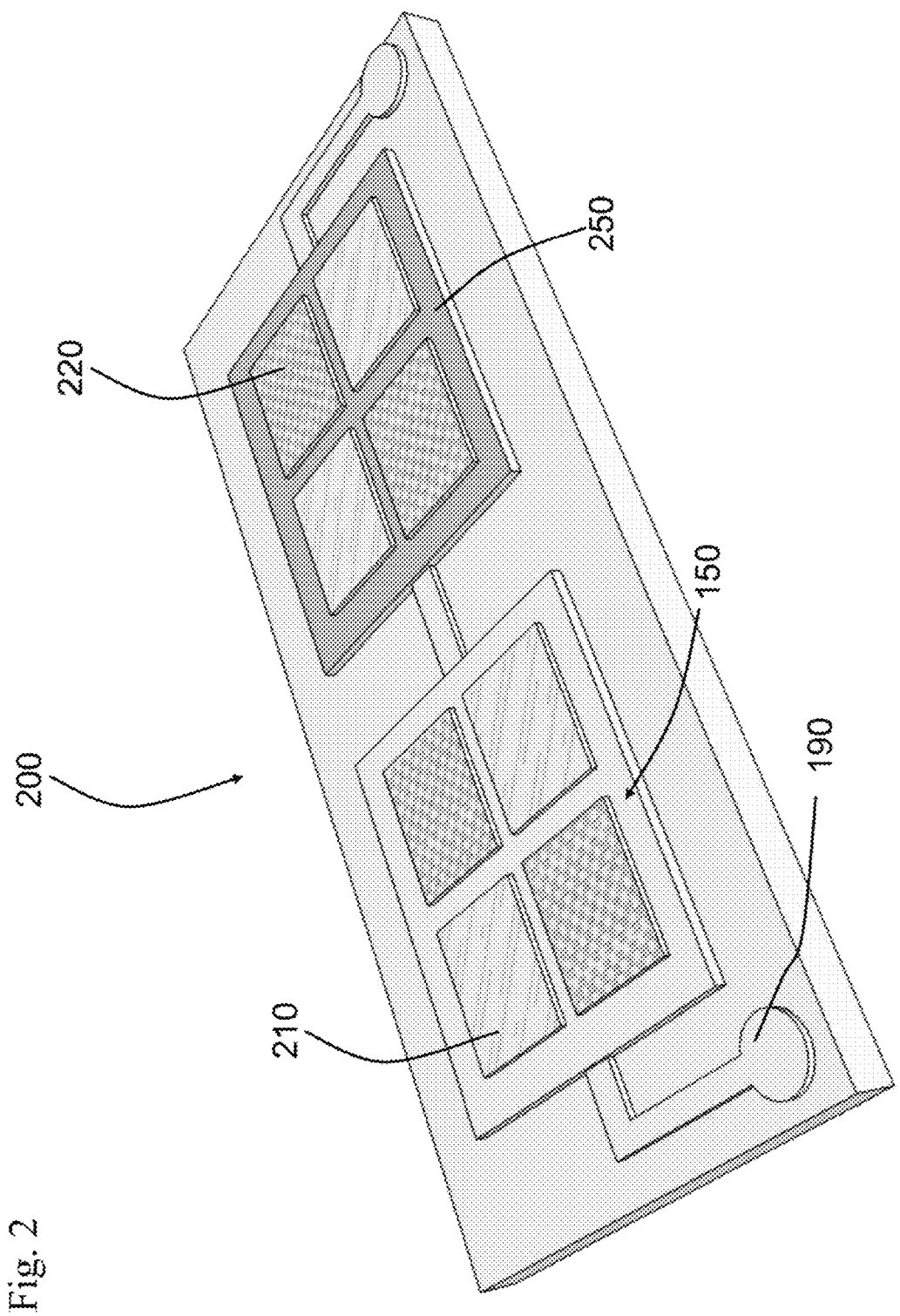
FIG. 2 is a schematic view of a different embodiment of a device in accordance with the present invention.

In another class of embodiments in accordance with the current invention, represented schematically in FIG. 2, at least one of the information containing regions of information devices 115 or/and integrated encryption devices 110 may be in a secured information region 200 where protected information that may contain at least part of an encryption key information is stored in secure information storage 210 locations and is at least partially collocated with preselected information stored in collocated preselected storage 220 locations. In such embodiments, both the secure information storage 210 locations and the collocated preselected information storage 220 locations may be prearranged to be in the vicinity of at least one destruction device 150 so that when destruction device 150 may be empowered to destroy the information in the secure information storage 210 locations it also necessarily destroys the information in the collocated preselected information storage 220 locations. The necessary destruction of information in secure information storage 210 locations and collocated preselected information storage 220 locations may permit the determination of the destruction status of the information stored in the secure information storage 210 locations by a simple readout or/and verification of the information in the collocated preselected information storage 220 locations. If the collocated preselected information is found to be destroyed then this indicates that the information in the secure information storage 210 locations has also been destroyed. Such verification capability may be useful even when the information in the secure information storage 210 locations is not known.

Related embodiments may also employ specialized destruction devices 150 that do not physically destroy the secure information storage 210 and collocated preselected information storage 220 locations, but instead may use physical processes to selectively destroy the information contained in those locations with particular information-only destruction segment 250.

A non-exhaustive list of examples of such information-only destruction devices 250 includes: integrated miniature heaters that anneal specific locations of memory storage locations in flash memory, ultraviolet or/and other photon illuminators that neutralize the charge stored in EPROM memory locations, high voltage sources that neutralize the charge stored in EEPROM memory locations, multi-memory cell erasure drivers, or/and combinations of the above.

Figure 3:
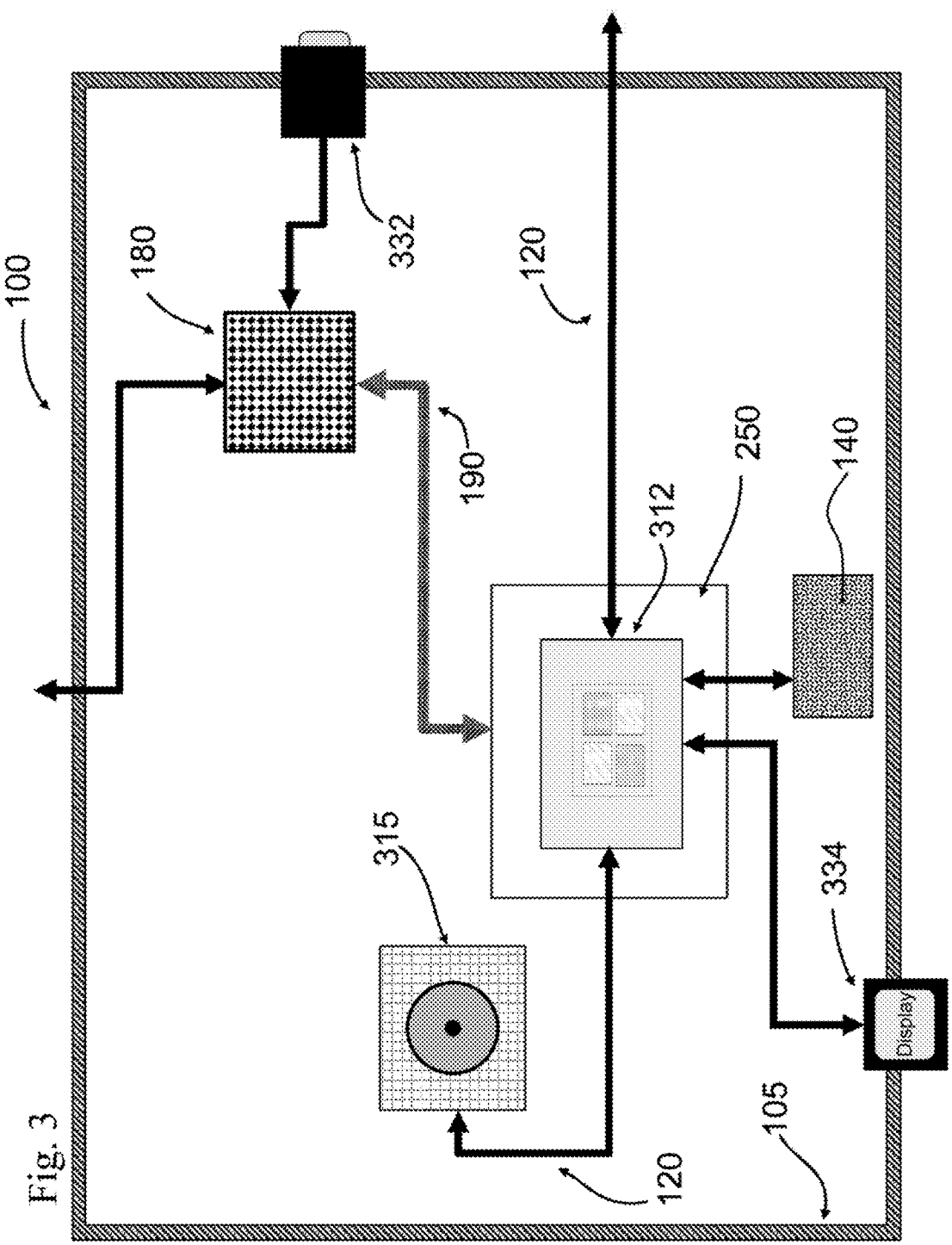
FIG. 3 is a schematic view of a different embodiment of a device in accordance with the present invention.

In other embodiments in accordance with the invention schematically illustrated in FIG. 3, the integrated encryption device 110 may be represented by a secure-region integrated encryption device 312 which incorporates at least one integrated encryption device 110 and embodies all of the functionality of an integrated encryption device but is further enhanced to contain at one secured information region 200 where secure information storage 210 locations are collocated with collocated preselected information storage 220 locations. In a secure system 100, the functions performed by the secure-region integrated encryption device 312 may appertain to functions performed by the integrated encryption device 110, with possible exceptions regarding additional functions related to arrangement of the collocation of secure information storage 210 and collocated preselected information storage 220 locations, and for the additional functions pertinent to inspection of the destroyed or not destroyed status of the information in the collocated preselected information storage 220 locations.

FIG. 3 schematically illustrates a set of embodiments of a secure system 100 that may incorporate a secure-region integrated encryption device 312. In such embodiments, at least some of the secure information containing storage locations 210, including regions that store at least part of the stored encryption key within the secure-region integrated encryption device 312 may be prearranged to be located in the vicinity of at least one information-only destruction device 250 such that when at least one destruction driver 180 is commanded to destroy the said information in the information containing regions the destruction driver 180 delivers sufficient energy and information to at least one information-only destruction device 250 through at least one destruction conduit 190 to empower the information-only destruction device 250 to produce destruction (obliteration) of information in the said information containing regions. The destruction of the said information makes the information unrecoverable and when the destroyed information contained at least part of the stored encryption key the destruction of the said information makes all other information that was encrypted with the encryption key unrecoverable.

Particular embodiments, as shown in FIG. 3 may include a disc storage device 315 as an information device 115 where the secure-region integrated encryption device 312 may store encrypted information; a manual switch 332 as a functional device 130 that may be used to send information to the destruction driver 180 to command it initiate destruction of information in at least one secured information region 200 of the secure-region integrated information device 312; a display device 334 as a functional device 130 that may be used to display the destroyed or not destroyed status of the information in the collocated preselected information storage 220 locations.

Using at least one secure-region integrated encryption device 312, the secure system 100 of above embodiments may encrypt information from at least one of the following information sources: information external to the secure system that comes to the system through at least one of the information pathways 120; information generated as a result of processing by at least one information device 115 of the secure system 100; information self-generated by at least one information device 115 of the secure system 100; from at least one functional device 130 of the secure system 100; information stored anywhere within the secured system 100. Information encrypted by the secure system 100 may be further acted upon by the secured system 100 to be at least one of the following: processed by at least one information device 115 of the secure system 100; stored in at least one information device 115 of the secure system 100; transferred for external use outside of the secure system 100 by at least one information pathway 120; sent to a functional device 130; at least partially destroyed.

Using at least one secure-region integrated encryption device 312 of the above embodiments, the secure system 100 may decrypt information from at least one of the following information sources: information external to the secure system that comes to the system through at least one of the information pathways 120; information generated as a result of processing by at least one information device 115 of the secure system 100; information self-generated by at least one information device 115 of the secure system 100; from at least one functional device 130 of the secure system 100; information stored anywhere within the secured system 100. Information decrypted by the secure system 100 may be further acted upon by the secured system 100 to be at least one of the following: processed by at least one information device 115 of the secure system 100; stored in at least one information device 115 of the secure system 100; transferred for external use outside of the secure system 100 by at least one information pathway 120; sent to a functional device 130; at least partially destroyed.

It may be noted that the FIG. 3 illustrated exemplary embodiment exemplifies usage of specific functional devices in a form of at least one manual switch 332 and at least one display device 334, both integrated in the system enclosure 105, and arranged for communication (input/output) of information between the secure system 100 and surroundings. It may be noted that ordinary users of the illustrated embodiment may use the manual switch to, inter alia, command initiate predetermined destruction sequences while monitoring the execution using the symbology as displayed on the display device 334.

Figure 4:
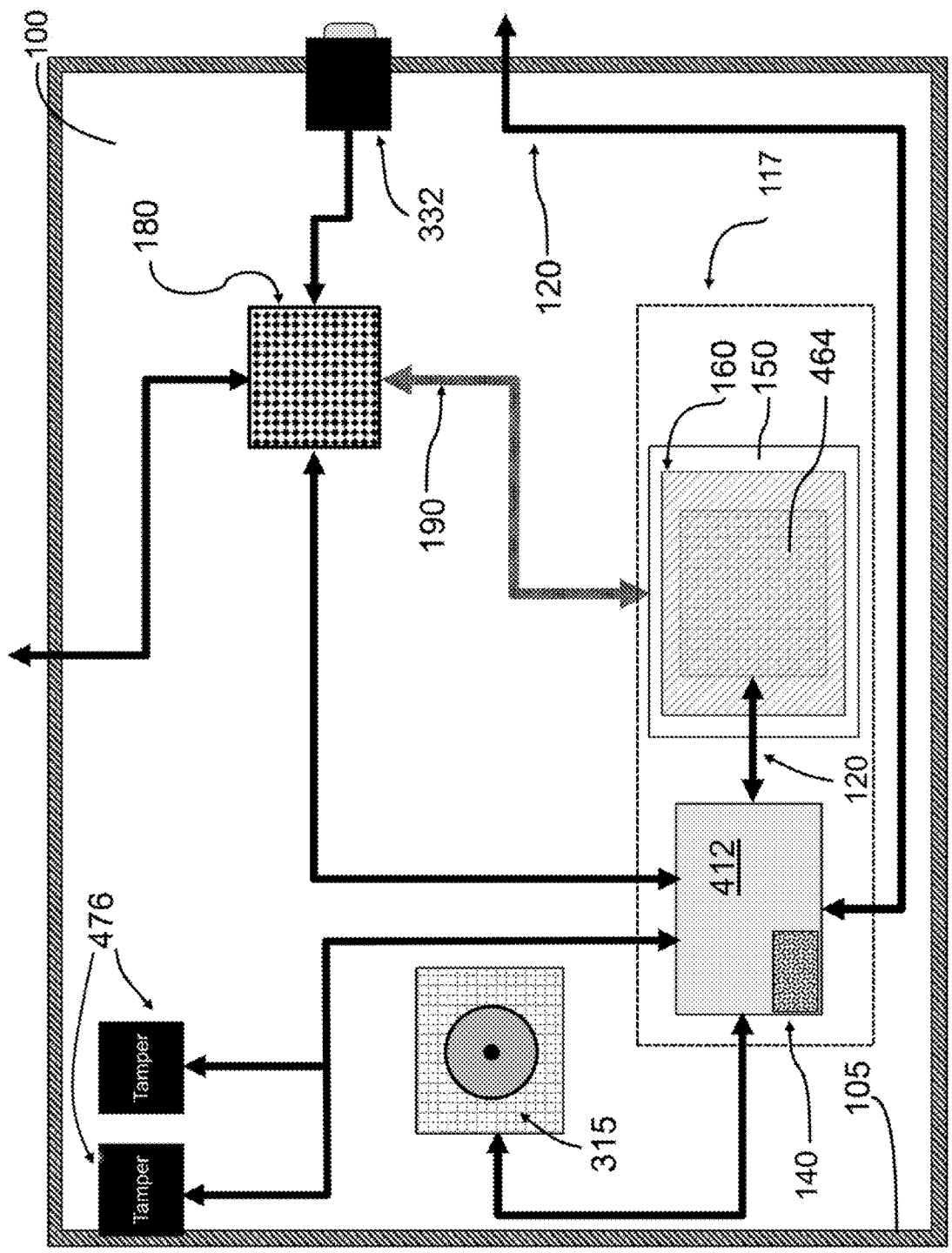
FIG. 4 is a schematic view of a different embodiment of a device in accordance with the present invention.

FIG. 4 schematically illustrates an additional set of embodiments of a secure system 100 that may incorporate at least one integrated encryption key device 412 arranged and implemented to combine an integrated encryption device 110 and at least one collocated physical key generator 140; while at least a portion of pertinent encryption key information has been arranged for storage on at least one predetermined encryption key information device 464. It may be evident to practitioners that such arrangements having the integrated encryption key device 412 arranged remotely to internally collocate at least one physical key generator 140 may offer additional benefits resulting (at least in part) from arranging a destruction device 150 substantially separately from the integrated encryption key device 412.

In addition, embodiments pertinent to the schematics as illustrated in FIG. 4 may incorporate tamper sensors 476 (either associated with the a system enclosure 105 or/and appropriately positioned inside or outside of the secure system 100) arranged to acquire information indicative of possible attempt to compromise integrity, security, or/and protection status of the secure information of the secure system 100, process the acquired information, and (optionally) initiate various defensive actions that may culminate in the obliteration of the sensitive data contents.

Figure 5:
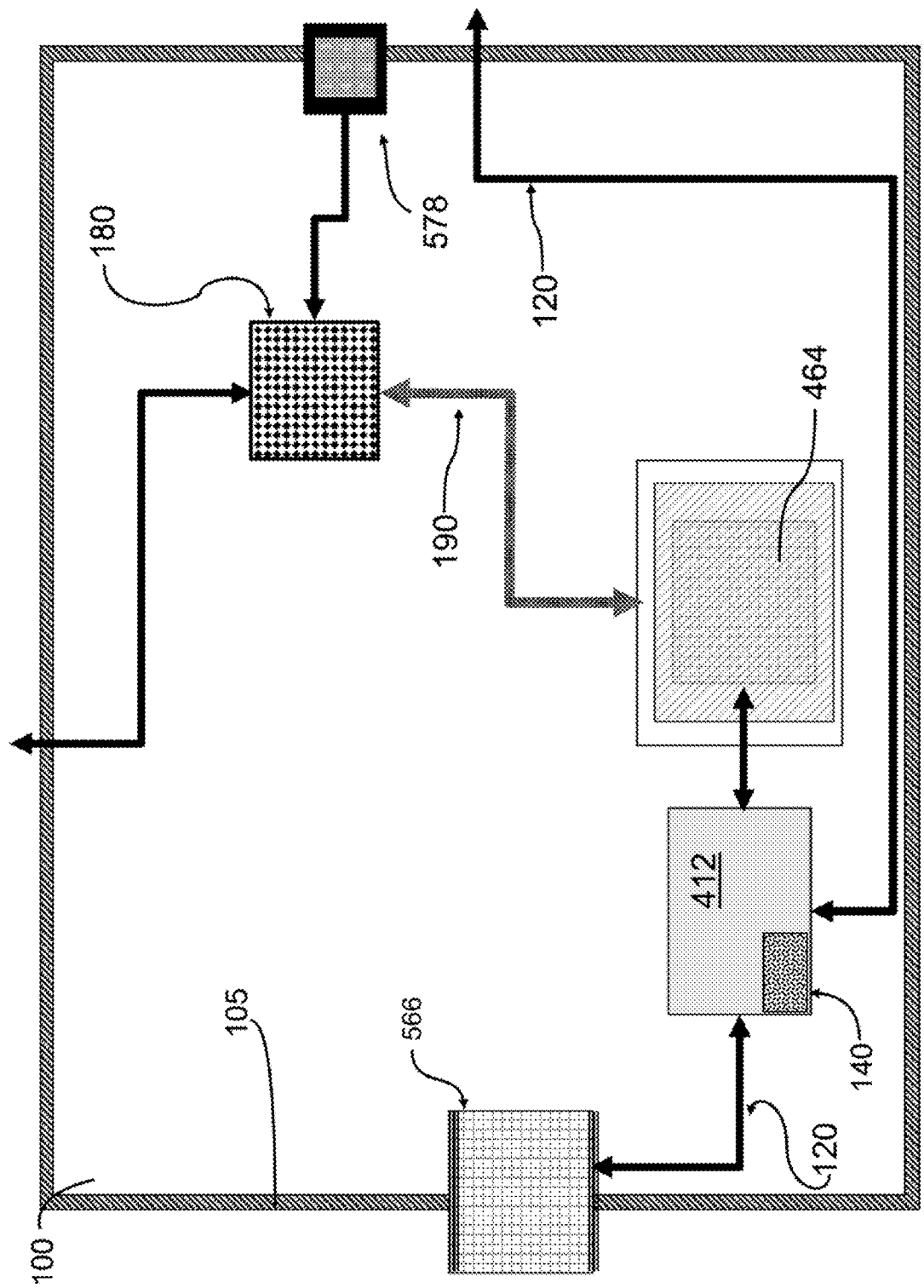
FIG. 5 is a schematic view of a different embodiment of a device in accordance with the present invention.

Regarding embodiments of secure systems 100 represented by the schematic in FIG. 5, at least one removable information device 566 has been incorporated and arranged to be conveniently connectable (and removable). The removable information device 566 may pertain to any information device 115 (as recited above) prearranged for convenience of connection with (and disconnection from) the secured system, desirably without need to physically reconfigure (either temporarily or for an extended time comparable with the operation time of the secure system 100) the balance of the secure system 100 hardware or/and software subsystems. Practitioners may note that removable information devices 566 arranged to be connectable through the system enclosure 105 (e.g. using prearranged openings, gates, ports, connectors, readers, etc.) may be of particular interest for the security of different embodiments of the secure system 100, for example containing and communicating sensitive data, portions of security software, portions of encoding information, or/and authorizations and information needed for initiation of safety related actions, including ultimate obliteration of the sensitive information. Such sensitive data may be encrypted for example using the at least one integrated encryption key device 412) or/and used by the at least one integrated encryption key device 412 for generating encryption keys.

In addition, the secure systems 100 represented by the schematic in FIG. 5 may include at least one communication element, represented by a keypad device 578, arranged for a direct command access to the secure system 100 by an authorized user (e.g. after entering an alphanumeric authorization code), including, but not limited to, initiation of the execution of safety procedures and emergency obliteration functions.

Figure 6:
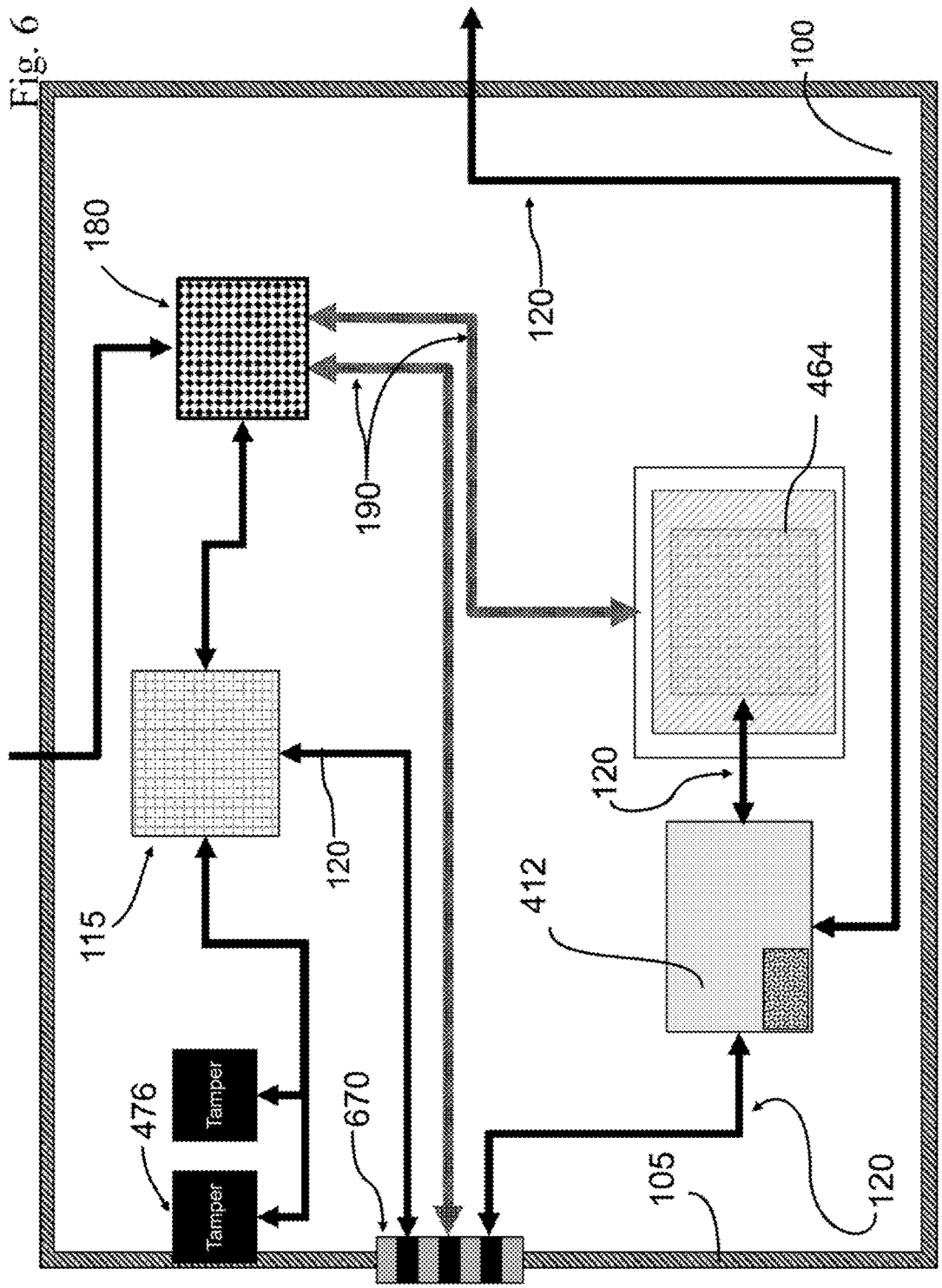
FIG. 6 is a schematic view of a different embodiment of a device in accordance with the present invention.

Regarding embodiments of secure systems 100 represented by the schematic in FIG. 6, at least one integrated connecting element 670 may be incorporated and arranged to facilitate exchange of information and energy between the secure system 100 and external devices, external information pathways or/and other components arranged on the outside of the system enclosure 105. For example, in some embodiments the integrated connecting element 670 may be prearranged for exchange of information (e.g. via one or more information pathways 120) or/and energy (e.g. via the at least one destruction conduit 190). It may be remarked that the above exchanges and communications may be, depending on the particular embodiments, either unidirectional or arranged to function in either direction. For example, the destruction conduits 190 may be arranged to conduct energy from outside energy sources to charge the destruction driver 180, or/and to conduct from the destruction driver 180 in order to drive external destruction devices. Also, the at least one integrated connecting element 670 may be arranged to communicate information between external and internal information devices 115, for example the information generated by the at least one integrated encryption key device 412.

Figure 7:
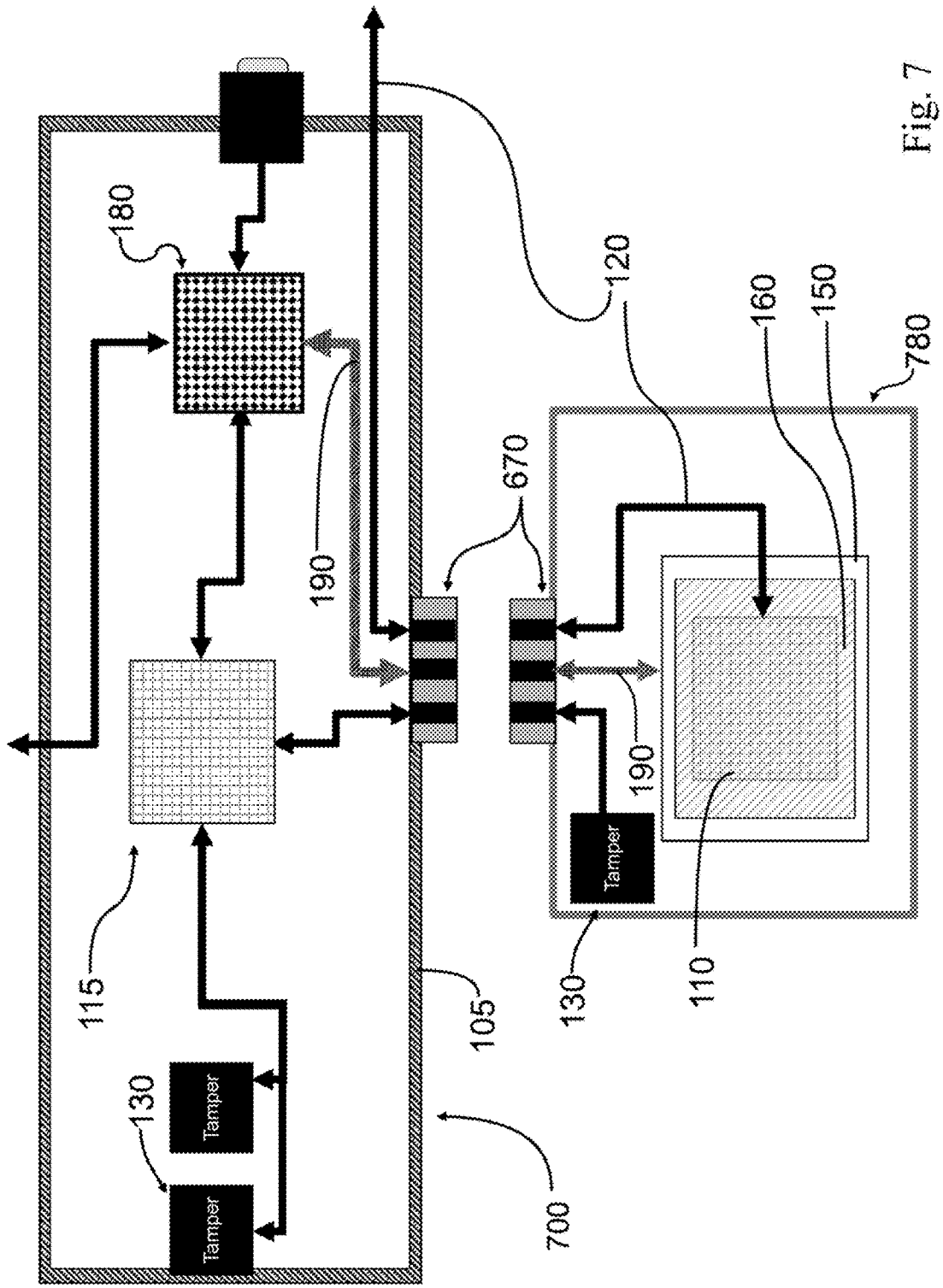
FIG. 7 is a schematic view of a different embodiment of a device in accordance with the present invention.

Additional embodiments related to the embodiments of FIG. 6, have been schematically illustrated in FIG. 7. In such embodiments, the at least one secure system 100 may be arranged to include the at least one processing subsystem 700 having at least one information device 115 arranged to communicate, assemble, control, process, or/and store information; and at least one destruction driver 180 arranged to initiate and support at last one controllable energy release. In addition, at least one security module 780 may be arranged to include at least another information device, for example, in the form of at least one the integrated encryption device 110 arranged to encrypt information using at least one encryption process enabled by at least one predetermined set of encryption key information, and at least one destruction device 150 arranged to localize at least one controllable energy release in a proximity of the at least one predetermined set of encryption key information, such that at least a fraction of the predetermined set of encryption key information has been obliterated during the controllable energy release.

It may be noted that in the FIG. 7 illustrates embodiments having the security module 780 arranged for ease of connectivity with the at least one processing subsystem 700, although different methods congruent with the modular features of the system may be employed. Also, different arrangements of the destruction mechanisms corresponding to the destruction driver 180 (e.g. drivers associated with regions inside or/and outside of the security module 780, drivers connectable to the connection element 670, external drivers arranged as separate modules, or/and various combinations of such) may be used in accordance with particular embodiments.

Figure 8:
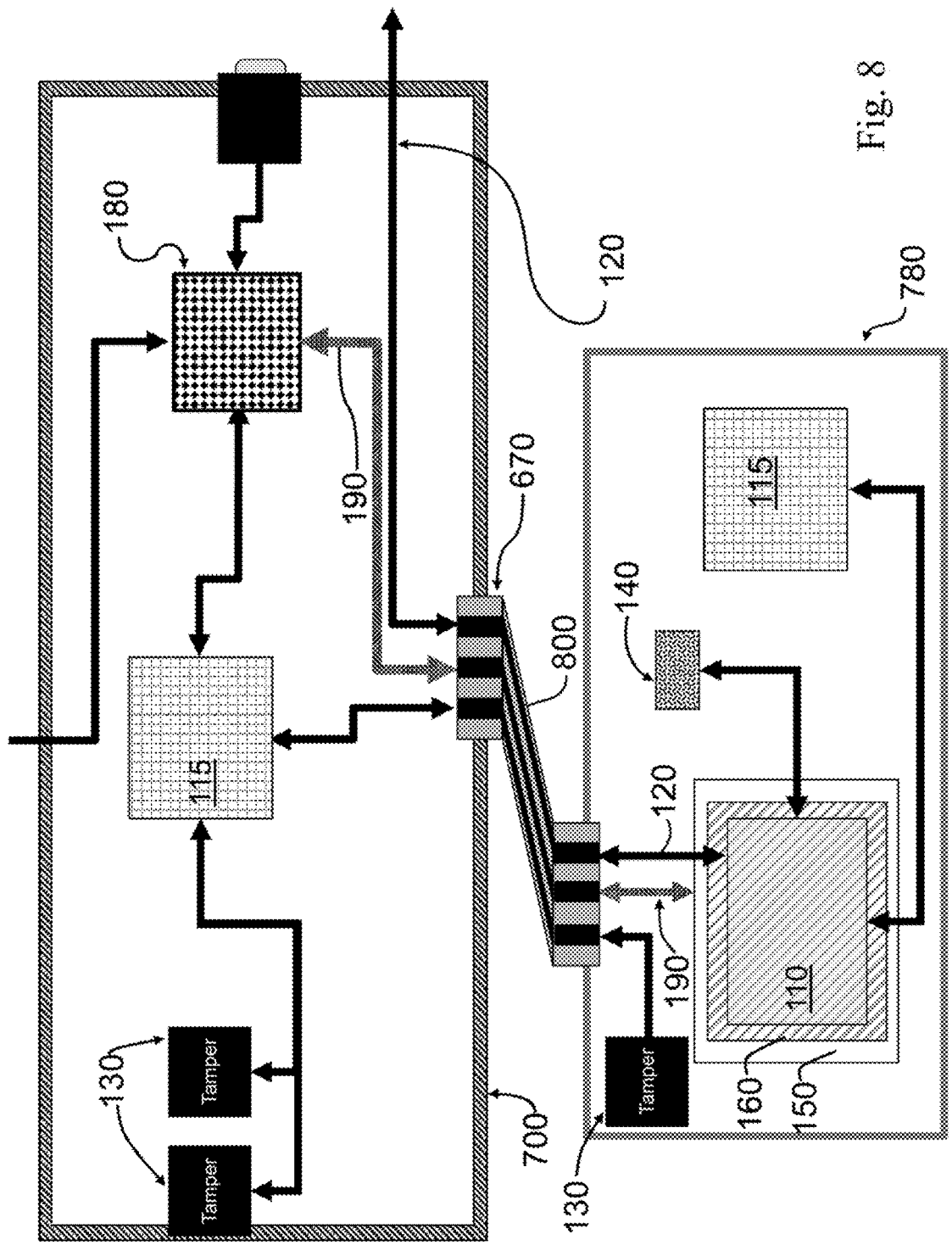
FIG. 8 is a schematic view of a different embodiment of as device in accordance with the present invention.

Yet another embodiment related to the embodiments of FIG. 7, has been schematically illustrated in FIG. 8. In such embodiments at least one security module 780 have been arranged for a remote connectivity (and disconnectivity) with the at least one processing subsystem 700 using at least one remote connector 800, for example in a form of at least one multi-conductor "ribbon" connecting cable. It should be noted that various wired or/and wireless remote connectors 800 may be used in different embodiments. Also, it may be noted that connecting distances between the security modules 780 and pertinent processing subsystem 700 may vary, for example as a function of power or/and discharge time of the energy release associated with the particular destruction device 150.

Figure 9:
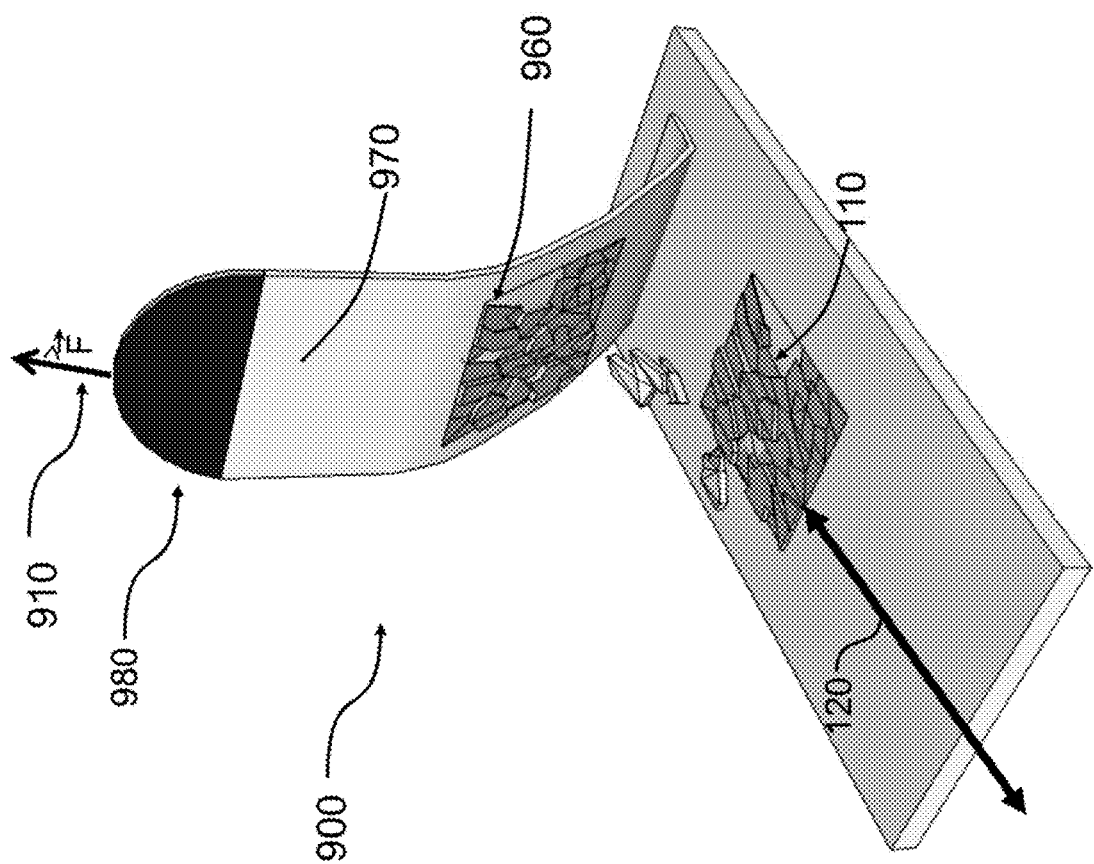
FIG. 9 is a schematic view of additional different embodiment of a device in accordance with the present invention.
Figure 10:
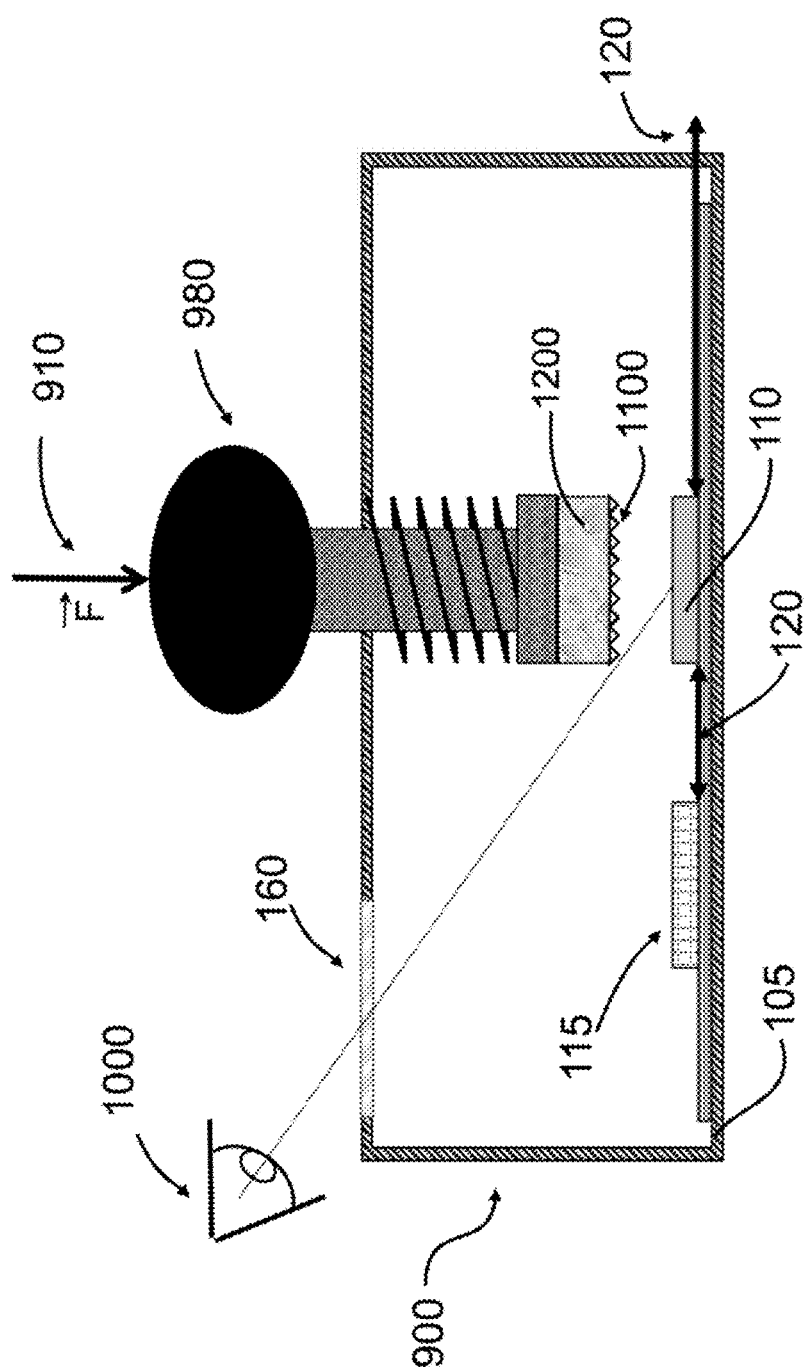
FIG. 10 is a schematic view of additional different embodiment of a device in accordance with the present invention.
Figure 11:
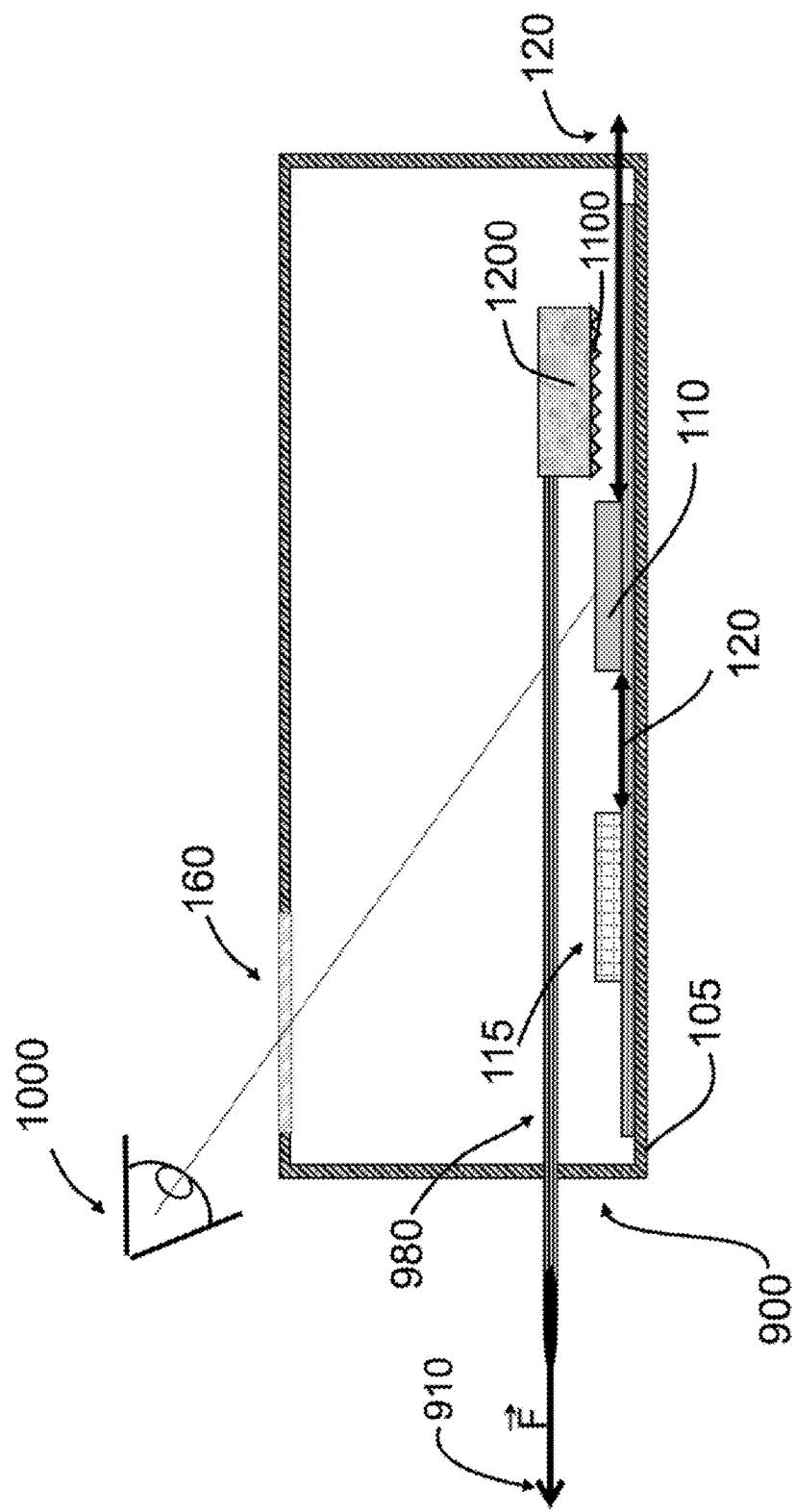
FIG. 11 is a schematic view of additional different embodiment of a device in accordance with the present invention.

Yet another class of different embodiments of secured subsystems 900 for prevention of tampering, unauthorized use, and unauthorized extraction of information has been illustrated in FIGS. 9-11. The illustrated embodiments pertains to cases where the obliteration of the stored information and sensitive structural arrangements may be achieved utilizing external sources of energy, and consequently, may not be conditioned the contemporary status (e.g. functional, idling, energized, in storage, defunct, etc) of the secured subsystem 900.

Regarding embodiments represented by the illustration in FIG. 9, obliteration of at least one integrated encryption device 110 may be performed using at least one mechanical destruction conduit 970 attached to at least one mechanical destruction driver 980. The at least one destructive driver may be actuated by actions of at least one mechanical force 910 as initiated controlled, and driven, for example by actions of at least one external participant 1000.

At least one mechanical destruction conduit 970 may be arranged to destroy the targeted information using direct work of the mechanical force 910 applicable to initiate and support controllable energy release in a proximity of the at least one secure information storage of the at least one encryption device 110 incorporating the predetermined set of encryption key information. The at least one mechanical destruction conduit 970 may be arranged to incorporates at least one adhesive portion 960 arranged to adhere to the at least one secure information storage of the at least one information device and to actuate the controlled energy release substantially utilizing forces of adhesion between the at least one adhesive portion 960 and the at least one secure information storage of the at least one information device.

In embodiments represented by the schematic in FIG. 10, the at least one mechanical destruction driver 980 may also incorporate at least one resilient portion 1100 arranged for forceful contact (including but not limited to: impact, cutting, abrasion, friction, delaminating, shearing, fracturing, or/and combinations of the above) with the at least one secure information storage of the at least one information device and to actuate the controlled energy release substantially utilizing work of forces of the impactual interaction upon the at least one secure information storage of the at least one information device. In addition, the at least one mechanical destruction driver 980 may also incorporate at least one chemically active portion 1200 arranged to controllably distribute chemically active compounds in the proximity of the impacted region or the at least one integrated encryption device 110 or/and the at least one information device 115.

In different embodiments the chemically active portion 1200 may incorporate different chemical compounds chosen for reactivity with constituents of the information devices 115 and, especially, the integrated encryption devices 110. In particular examples using Si-based semiconductors, chemically active compounds based on hydrofluoric acid HF and chemical based on strong alkalis (in particular KOH) arm known to be effective attack silicon dioxide resulting in effective destruction of supported structures. It is also known to practitioners that concentrated alkali or/and hydroxide may react with the $SiO_2$ structures (as well as basic metal oxides including sodium oxide, potassium oxide, lead(II) oxide, zinc oxide, or mixtures of oxides). In the cases of other types of semiconductor materials (including, but not limited to compounds of gallium, indium, aluminum, arsenic etc.) other concentrated acids or/and reactive alkalis may be also implemented.

Regarding versions of above embodiments illustrated schematically in FIG. 11, a common mechanical destruction driver 980 may be utilize to initiate and sustain obliteration of stored or/and structural information associated with more than one distinct information devices. For example the mechanical distraction driver 980 in FIG. 11 may interact with the integrated encryption device 110 and the at least one information device 115 either in sequence (as illustrated in FIG. 11), in parallel, or/and in combination of the above (for example when a plurality of information devices are arranged for targeted destructions).

The current invention has been described with references to particular embodiments. While specific values, relationships, materials and steps have been set forth for purpose of describing concepts of the invention, it will be appreciated by persons skilled in the art that numerous variations or/and modifications may be made to the invention as shown in the specific embodiments without departing from the spirit or/and scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

I claim:

1. An apparatus for prevention of tampering, unauthorized use, and unauthorized extraction of information from at least one secure system, comprising:
    at least one information device arranged to communicate, assemble, control, process, or store information;
    at least one integrated encryption segment associated with at least one encryption device and arranged to encrypt the information using at least one encryption process enabled by at least one predetermined set of encryption key information incorporated in at least one information containing region of at least one secure information storage of the at least one information device; and
    at least one destruction driver arranged to deliver energy through at least one destruction conduit to at least one destruction device sufficient to initiate and support at least one controllable energy release in the at least one destruction device, the at least one destruction device positioned in a proximity of the at least one information containing region of the at least one secure information storage of the at least one information device and arranged to localize the at least one controllable energy release in a proximity of the at least one predetermined set of encryption key information, such that at least a fraction of the at least one predetermined set of encryption key information and at least a fraction of the at least one information containing region have been unrecoverably obliterated during the controllable energy release;
    wherein the obliterated fraction of the at least one predetermined set of encryption key information has been preselected to include a functional segment of encrypting key information necessary for decoding of the at least one information device communicated, assembled, controlled, processed, or stored information.

2. The apparatus of claim 1, comprising at least one system enclosure arranged to indicate at least one outer boundary, enclosing the at least one information device and at least one associated functional device arranged to generate at least one signal indicative of an attempt of tampering.

3. The apparatus of claim 1, wherein the at least one secure information storage of the at least one information device comprises at least one secure information containing region arranged to store at least a portion of the at least one predetermined set of encryption key information and at least one information containing region arranged to store at least a portion of preselected verification information such that the at least one controllable energy release unrecoverably obliterates at least a portion of the at least one secure information containing region and also destroys at least the portion of the preselected verification information, so that a failure to retrieve the at least the portion of the preselected verification information indicates the unrecoverable obliteration of the at least the portion of the at least one predetermined set of encryption key information.

4. The apparatus of claim 3, comprising at least one additional information destruction device arranged to destroy the at least the portion of the preselected verification information substantially simultaneously with the at least one controllable energy release.

5. The apparatus of claim 1, wherein the at least one secure information storage of the at least one information device comprises at least one secure information containing region arranged to store in a substantially collocated manner at least a portion of the at least one predetermined set of encryption key information and at least a portion of preselected verification information such that the at least one controllable energy release in the proximity of the at least one secure information containing region substantially simultaneously unrecoverably obliterates the at least the portion of the at least one predetermined encryption key information and the portion of the preselected verification information, so that a failure to retrieve the at least the portion of the preselected verification information indicates the unrecoverable obliteration of the at least the portion of the at least one predetermined set of encryption key information.

6. The apparatus of claim 1, wherein the at least one information device comprises at least one observation window arranged to provide an observable indication of the unrecoverable obliteration of the obliterated fraction of the at least one predetermined set of encryption key information.

7. The apparatus of claim 6, wherein the at least one observation window has been arranged to provide a visual indication of the unrecoverable obliteration of the obliterated fraction of the at least one predetermined set of encryption key information.

8. The apparatus of claim 1, wherein the at least one integrated encryption segment represents a dedicated encryption device arranged to store at least a portion of the predetermined encryption key information.

9. The apparatus of claim 1, wherein the at least one information device comprises at least one physical key generator arranged to dynamically generate at least one variable portion of encryption key information.

10. The apparatus of claim 1, wherein the at least one secured system have been arranged to support at least one removable information device arranged for insertion and removal without a need for additional reconfiguration of the secure system.

11. The apparatus of claim 1, wherein the at least one integrated encryption segment incorporates at least one dedicated encryption device arranged to combine the at least one integrated encryption device and at least one collocated physical key generator.

12. The apparatus of claim 1, wherein the at least one information device is chosen from a set of devices consisting of disc storage device, electronic memory device, magnetic memory device, RAM, DRAM, FPM DRAM, EDO DRAM, VRAM, SDRAM, RDRAM, SDRAM, PSRAM, SRAM, ROM, PROM, EPROM, EEPROM, NVRAM, MRAM, and combinations thereof.

13. The apparatus of claim 1, comprising at least one functional device chosen from set of functional devices consisting of: push-button positive electrical contact switches, multiple press push-button trigger sequence generators, keypad trigger generators, physical key switches, rotational encoder switches, touch pad switches, capacitive switches, fingerprint readers, palm readers, retinal readers, tamper sensors, pressure sensors, radiation sensors, thermal sensors, electromagnetic radiation sensors, acoustic sensors, vibration sensors, keyboards, keypads, optical detectors, image detectors, radio receivers, encoders, rf transmitters, servo motors, electromechanical actuators, transducers, plasma generators, lasers, video displays, LED displays, LCD displays, indicator light devices, and combinations thereof.

14. The apparatus of claim 1, wherein the at least one destruction device associated to the at least one destruction conduit is further arranged to localize the at least one controllable energy release in the proximity of the at least one secure information storage and at least one chemically active portion such that at least one fraction of the at least one predetermined set of encryption key information has been unrecoverably obliterated during the at least one controllable energy release, and at least another fraction of the at least one predetermined set of encryption key information has been unrecoverably obliterated by a chemical reaction between the at least one chemically active portion and the at least one secure information storage.

15. The apparatus of claim 14, wherein the at least one chemically active portion incorporates chemically active compounds chosen from a set of chemically active compounds consisting of: hydrofluoric acid, sodium hydroxide, potassium hydroxide, sodium oxide, potassium oxide, lead (II) oxide, zinc oxide, mixtures of potassium oxide and sodium hydroxide, and mixtures of the listed oxides.

16. An apparatus for prevention of tampering, unauthorized use, and unauthorized extraction of information from at least one distributed secure system, comprising:
at least one processing subsystem, wherein the at least one processing subsystem includes:
at least one information device arranged to communicate, assemble, control, process, or store information; and
at least one destruction driver arranged to deliver energy through at least one destruction conduit sufficient to initiate and support at least one controllable energy release; and
at least one security module, wherein the at least one security module includes:
at least another information device arranged to encrypt the information using at least one encryption process enabled by a set of encryption key information stored in at least one information containing region; and
at least one destruction device associated with the at least one destruction driver incorporated in the at least one processing subsystem via the at least one destruction conduit, the at least one destruction device positioned in a proximity of the at least one information containing region of the at least another information device and arranged to localize the at least one controllable energy release in a proximity of the set of encryption key information, such that at least a fraction of the set of encryption key information and at least a fraction of the at least one information containing region have been unrecoverably obliterated during the at least one controllable energy release;
wherein the obliterated fraction of the set of encryption key information has been preselected to include a functional segment of encrypting key information necessary for decoding of the at least one information device communicated, assembled, controlled, processed, or stored information.

17. The apparatus of claim 16, comprising at least one integrated connecting element arranged to functionally connect and disconnect the at least one processing subsystem and the at least one security module, wherein the at least one integrated connecting element is further arranged to deliver sufficient energy from the at least one destruction driver to the at least one destruction device through the at least one destruction conduit to empower the at least one destruction device to produce the at least one controllable energy release.

18. The apparatus of claim 16, wherein the at least one information device comprises at least one secure information containing region arranged to store at least a portion of the set of encryption key information and at least one information containing region arranged to store a portion of preselected verification information such that the at least one controllable energy release unrecoverably obliterates at least a portion of the at least one secure information containing region and also destroys at least the portion of the preselected verification information, so that a failure to retrieve the at least the portion of the preselected verification information indicates the unrecoverable obliteration of the at least the portion of the set of encryption key information.

19. The apparatus of claim 16, comprising at least one additional information destruction device arranged to destroy the at least the portion of the preselected verification information substantially simultaneously with the at least one controllable energy release in the proximity of the set of encryption key information.

20. The apparatus of claim 16, comprising at least one dedicated encryption device arranged to store in at least one secure information containing region in a substantially collocated manner at least a portion of the set of encryption key information and at least a portion of preselected verification information such that the at least one controllable energy release in the proximity of the at least one secure information containing region substantially simultaneously unrecoverably obliterates the at least the portion of the set of encryption key information and the at least the portion of the preselected verification information, so that a failure to retrieve the at least the portion of the preselected verification information indicates the unrecoverable obliteration of the at least the portion of the encryption key information.

21. The apparatus of claim 16, wherein the at least one information device comprises at least one transparent viewing window arranged to provide a visual indication of the unrecoverable obliteration of the obliterated fraction of the set of encryption key information.

22. The apparatus of claim 16, wherein the at least one security module includes at least one tamper sensor arranged to detect and to classify at least one attempt of unauthorized extraction of information from the at least one distributed secure system.

23. A subsystem for prevention of tampering, unauthorized use, and unauthorized extraction of information from at least one secure system, comprising:
at least one information device arranged to communicate, assemble, control, process, or store information;
at least one integrated encryption segment associated with the at least one information device and arranged to encrypt the information using at least one encryption process enabled by a set of encryption key information incorporated in at least one secure information storage of the at least one information device having at least one information containing region; and at least one mechanical destruction driver attached to at least one mechanical destruction conduit arranged to substantially utilize direct work of at least one mechanical force applicable to initiate and support at least one controllable energy release in a proximity of the at least one secure information storage of the at least one information device incorporating the set of encryption key information, such that at least a fraction of the set of encryption key information and at least a fraction of the at least one information containing region have been unrecoverably obliterated during the at least one controllable energy release;

wherein the at least one mechanical destruction driver initiating and supporting the at least one controllable energy release has been actuated by actions of the at least one mechanical force as initiated, controlled, and driven by actions of at least one external participant.

24. The subsystem of claim 23, wherein the at least one mechanical destruction conduit incorporates at least one adhesive portion arranged to adhere to the at least one secure information storage of the at least one information device and to actuate the at least one controlled energy release substantially utilizing work of forces of adhesion between the at least one adhesive portion and the at least one secure information storage of the at least one information device.

25. The subsystem of claim 23, wherein the at least one mechanical destruction driver incorporates at least one resilient portion arranged for an impactual interaction with the at least one secure information storage of the at least one information device and to actuate the at least one controlled energy release substantially utilizing work of forces of the impactual interaction upon the at least one secure information storage of the at least one information device.

26. The subsystem of claim 23, wherein the at least one mechanical destruction driver incorporates at least one chemically active portion arranged in the proximity of the at least one secure information storage of the at least one information device and to actuate a controllable distribution of chemically active compounds incorporated in the at least one chemically active portion and to support at least one chemical reaction between the at least one chemically active portion and the at least one secure information storage of the at least one information device such that the at least the fraction of the set of encryption key information has been unrecoverably obliterated during the at least one chemical reaction.

* * * * *